Nov. 27, 1951     F. C. TRAUTVETTER     2,576,154
ADJUSTABLE FILLING DEVICE FOR FEED TROUGHS
Filed July 23, 1948     2 SHEETS—SHEET 1
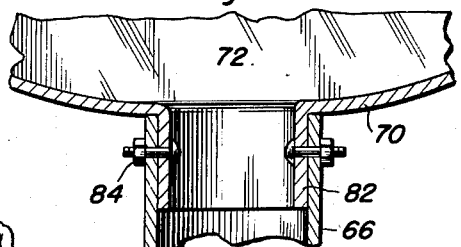
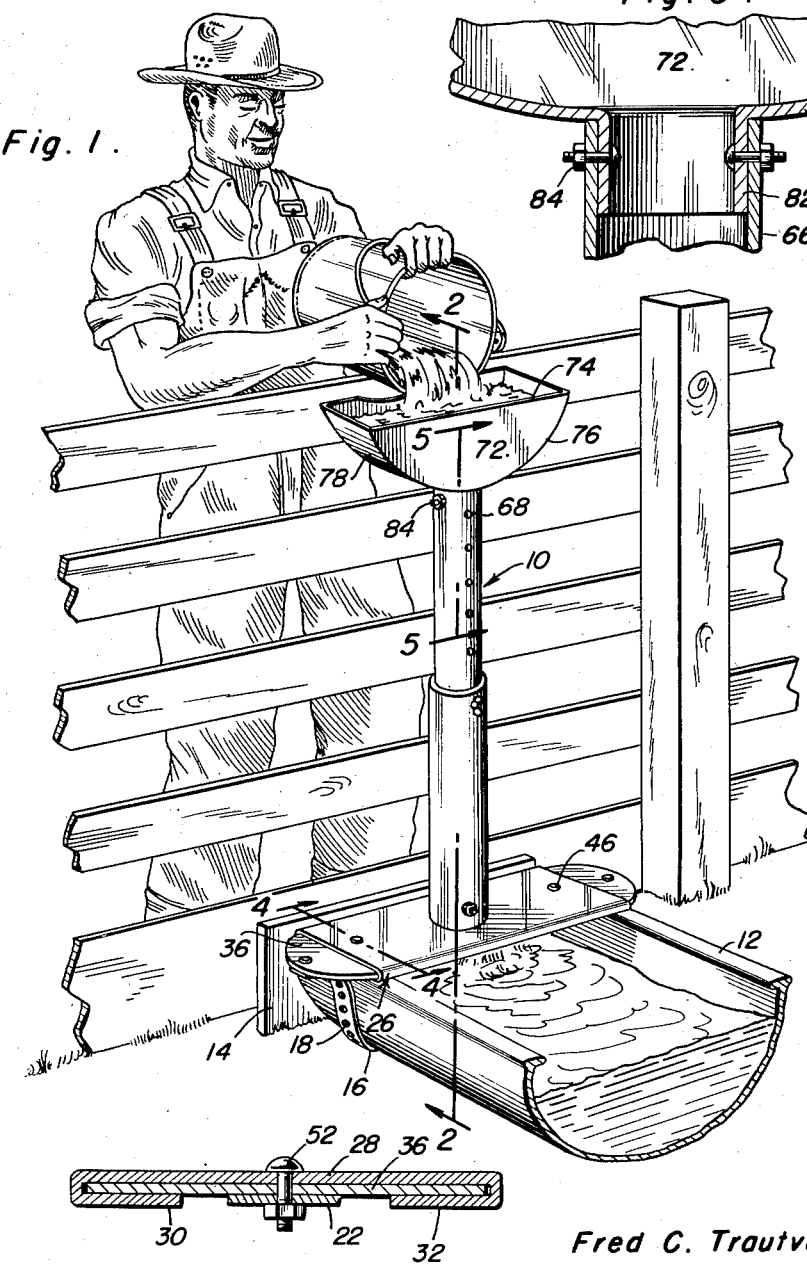
Fred C. Trautvetter
INVENTOR.
BY Nov. 27, 1951        F. C. TRAUTVETTER        2,576,154
ADJUSTABLE FILLING DEVICE FOR FEED TROUGHS
Filed July 23, 1948        2 SHEETS—SHEET 2
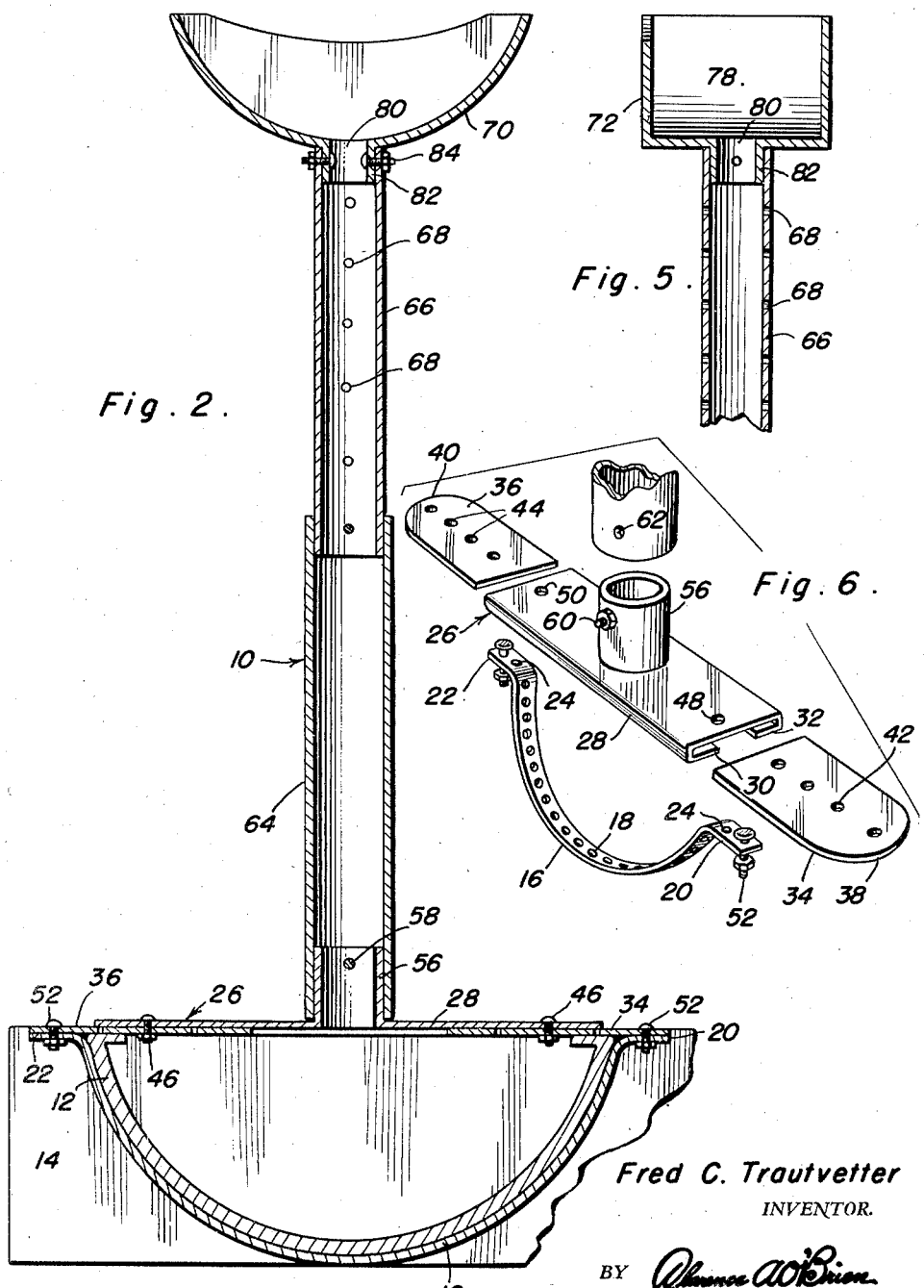
Fred C. Trautvetter
INVENTOR.

Patented Nov. 27, 1951

2,576,154

UNITED STATES PATENT OFFICE 2,576,154

ADJUSTABLE FILLING DEVICE FOR FEED TROUGHS

Fred C. Trautvetter, Warsaw, Ill.

Application July 23, 1948, Serial No. 40,324

4 Claims. (Cl. 119—61)

This invention relates generally to feeding troughs for hogs and other stock and more particularly to an attachment for a standard and conventional trough and has for its primary object to enhance the usefulness of an existing feed trough and to enable a farmer to fill the trough with greater ease and convenience and with a minimum of time and labor expended.

Another important object of this invention is to provide a filling assembly for a feed trough, the assembly being adjustable for attachment to any type, style or size of troughs and being slidably mounted on the trough for positioning at any desired portion of the trough, insuring uniform feeding of the stock.

Another object of this invention is to provide a funnel-like attachment for a feeding trough, so that slop or semi-liquid feed and water or buttermilk may be deposited in the trough in a manner convenient to the farmer and without loss of the feed or liquid and, also, without any possibility of injury to the farmer due to a jostling received by the animals.

These and ancillary objects, to become more fully apparent upon a perusal of the following description, are attained by this invention, a preferred embodiment of which is set forth in the following description and the accompanying drawings, wherein:

Figure 1 is a view in perspective of this invention, showing the same in attachment and use with a conventional feed trough;

Figure 2 is an enlarged vertical sectional view taken substantially on the plane of line 2—2 of Figure 1;

Figure 3 is an enlarged fragmentary sectional view, illustrating the detachable attachment of the funnel-like member to the adjustable tube;

Figure 4 is an enlarged transverse sectional view taken substantially on the plane of the line 4—4 of Figure 1;

Figure 5 is an enlarged vertical sectional view taken on line 5—5 of Figure 1; and, Figure 6 is an exploded perspective view of the means provided for attaching the filling assembly or unit to an existing feed trough.

Referring now more particularly to the drawings, wherein similar characters of reference designate corresponding parts throughout, this invention, generally denoted by the reference numeral 10, is shown, with particular reference to Figure 1, in attachment to and association with an existing conventional type feed trough 12, which is of approximately semi-circular cross section and extends between end supports 14.

Of course, the mere illustration of a particular form or type of trough is by no means meant to impart a limitation to this invention, since this invention comprises an attachment, which is adapted for use with any type or style of trough such as a rectangular open or closed trough and is attachable to any unit that serves as a fluid or semi-fluid feed receptacle and container.

In the care and feed of livestock, such as hogs or the like animals, it is a customary practice to place water, slop, buttermilk or other semi-fluid feed in a conventional open-top feed trough, by conveying the feed to the trough in a pail and depositing the feed in the trough. However, such a practice places the farmer in a position to receive an injury from the pushing and shoving tactics of the animals to reach the trough and, also, causes the feed to be spilled by the animals. It is, therefore, the primary aim and purpose of this invention to provide a detachable filling unit for a trough, so that the farmer may stand outside of the animal enclosure and fill the trough, and, further, so that the animals may not gain access to the filling receptacle but are forced to confine their eating efforts to the feed trough itself. Paralleling this primary aim and purpose, a secondary objective of this invention resides in the provision of a detachable and adjustable filling attachment for a trough, the attachment being adjustable in a horizontal and vertical plane for various positioning relative to the ends and center of the trough.

In this respect, an attaching strap 16 is adapted to engage the bottom outer surface of the trough 12 and to extend upwardly about the opposed sides of the trough, as seen in Figure 2. When the trough is of an approximately semi-circular cross-sectional configuration, the attaching strap 16 is preferably arcuate so as to snugly engage the outer walls of the trough. However, it is within the purview of this invention that the attaching strap can be formed with a straight horizontal section, having opposed right angular lateral extensions, the extensions being vertically disposed to engage the straight vertical side walls of a trough. Thus, the particular form and shape of the attaching strap 16 would be dependent upon the size and shape of the feed trough.

In any respect, the strap 16 would be apertured throughout its length as at 18 for adjustment purposes and would have a pair of laterally extending supporting arms 20 and 22, which are apertured as at 24.

A complementary extensible unit 26 is provided to transversely seat upon the open top of the trough 12 and to be supported by the lateral extensions 20 and 22 of the attaching strap 16. The unit 26 is preferably extensible so as to accommodate the varied width of a feed trough, in association with the spaced adjusting apertures 18 in the strap. Further, the unit 26 in association with the strap 16 can be slidably adjusted longitudinally on the trough so that the same may be positioned at any desired place along the length of the trough. The companion unit 26 is shown, as in Figure 6, as comprising a main body plate 28, having its longitudinal marginal edges inturned to form inturned opposed side flanges 30 and 32 defining a pair of channels. End extension plates 34 and 36, having arcuate ends 38 and 40 are adapted to slidably move in the channels defined by the flanges 30 and 32. For adjustment purposes the end plates are medially apertured in longitudinal fashion as at 42 and 44. The end plates are secured in position in association with the body plate 28 by any suitable assembly, such as a bolt and nut assembly 46, which is vertically disposed in apertures 48 and 50 in the body plate and received in the desired aperture 42 or 44 of the end plate. A conventional bolt and nut assembly 52 is disposed through one of the apertures 42 and one of the apertures 44 and received within the apertures in the lateral extensions 20 and 22 of the strap 16 so as to secure the companion unit 26 to the strap in any adjusted and desired position.

Extending integrally, in vertical fashion, upon the body plate 28 is a tubular extension or collar 56, having aligned transverse apertures 58 disposed therethrough, adjacent the upper ends. A connecting pipe 64 is concentrically disposed about the extending collar 56 and is adjustably secured thereto, through the medium of an attaching agent 60. The attaching agent 60, such as a bolt and nut, is inserted through the apertures 58 in the collar and similar transversely aligned apertures 62 in the lower end of the connecting pipe 64.

A complementary tube or pipe 66, having transversely aligned openings or apertures 68 vertically spaced throughout, is adapted to be concentrically disposed within the upper portion of the connecting pipe 64. A funnel-like member 70 is seated within the upper terminating portion of the tube 66 and is adapted to receive the feed, which is conveyed through the pipes 66 and 64 into the trough 12. The funnel-like member 70 includes a pair of opposed semi-circular side walls 72, having an upper straight edge 74 disposed horizontally and an arcuate edge 76. A unitary arcuately formed bottom and end walls plate 78 is connected at the arcuate edge of the opposed side walls defining the funnel-like member 70. A discharge aperture or opening 80 is formed in the central lowermost portion of the arcuate bottom wall 78 and has integrally depending thereabout a collar 82. The collar 82 is transversely apertured to receive a pair of attaching members, such as a bolt and nut assembly 84, whereby the funnel 70 is seated upon the pipe 66 and securely supported thereon.

In operation, with respect to Figure 1 of the drawings, a farmer can carry the slop or semi-fluid feed to the trough 12 in a pail or similar receptacle. The funnel 70 can be vertically adjusted with respect to a fence or similar enclosure and can be positioned at any portion of the trough, so that the farmer can stand outside of the back enclosure and conveniently and easily deposit the feed in the funnel. The feed is then conveyed through the pipes to the trough.

However, since many other purposes and objects of this invention will become apparent to those skilled in the art upon a perusal of the foregoing description, it is to be understood that certain changes in style, size and components may be effected without a departure from the spirit of the invention and within the scope of the appended claims.

Having described the invention, what is claimed as new is:

1. In combination with a feed trough having an open top, a device for filling the trough with a semi-fluid feed comprising an attaching strap adapted to transversely encircle the outer walls of the trough, an extensible base unit secured to said strap, an extending collar on said base unit, telescoping pipe sections supported on said collar and a funnel carried by said pipe sections and communicated with the trough.

2. The combination of claim 1, wherein said base unit comprises a body plate transversely seated on the open top of the trough, longitudinal inturned marginal edges on the plate defining opposed channels, extensible end plates adapted to be received in the opposed channels at opposite ends of the body plate and means for securing said plates together.

3. The combination of claim 1, wherein said funnel includes a pair of spaced opposed semi-circular side walls connected by a centrally apertured arcuate bottom wall.

4. A filling attachment for open top feed troughs, which attachment comprises an attaching strap adapted to transversely engage the outer walls of the trough, an extensible base unit secured to said strap, an extending collar on said base unit, conduit sections supported on said collar, and a funnel carried by said conduit sections and communicating with the trough.

FRED C. TRAUTVETTER.

REFERENCES CITED

The following references are of record in the file of this patent:

UNITED STATES PATENTS

| Number | Name | Date |
| --- | --- | --- |
| 173,717 | Douglas | Feb. 22, 1876 |
| 516,339 | Wellsteed | Mar. 31, 1894 |
| 1,522,084 | Swearingen | Jan. 6, 1925 |
| 1,631,129 | Hiscox et al. | June 7, 1927 |
| 1,660,442 | Hampton | Feb. 28, 1928 |
| 1,692,039 | Hinz | Nov. 20, 1928 |

FOREIGN PATENTS

| Number | Country | Date |
| --- | --- | --- |
| 14,027 | Great Britain | Nov. 1, 1886 |
| 93,735 | Germany | Sept. 24, 1897 |
| 95,022 | Austria | Nov. 26, 1923 |
| 109,948 | Australia | Mar. 14, 1940 |

OTHER REFERENCES

Popular Mechanics, page 152, January 1939.
Popular Mechanics, page 314, August 1939.